Nov. 20, 1962     W. C. HOFF ETAL     3,064,567
POSTAGE METER BASE
Filed April 17, 1961     3 Sheets-Sheet 3
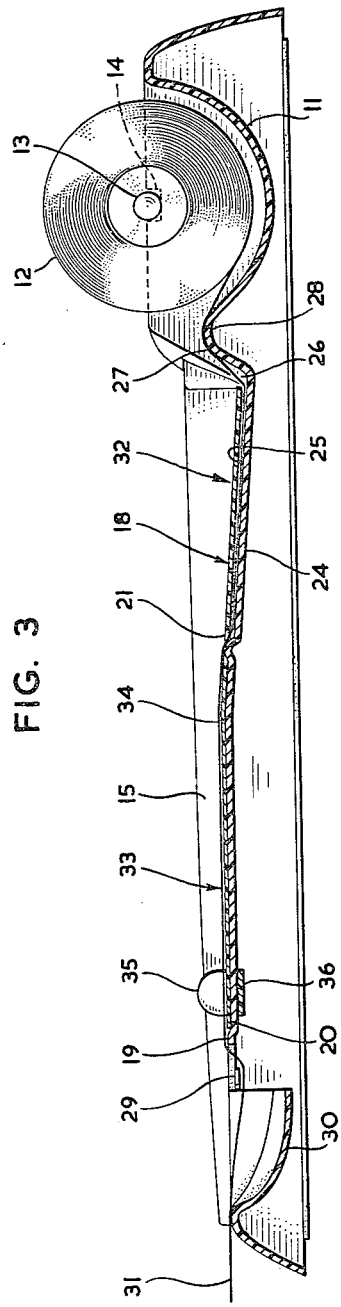
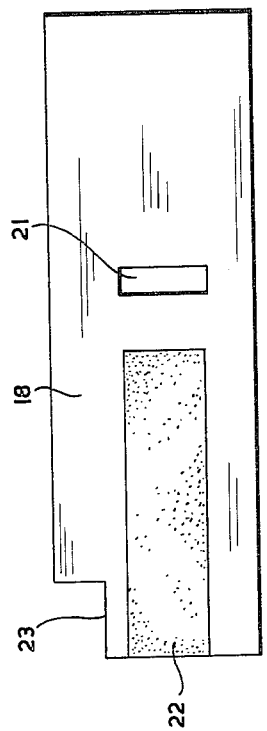
INVENTORS
W. C. HOFF
R. SOMERVILLE
BY: *Maybee & Legris*
ATTORNEYS 3,064,567
POSTAGE METER BASE
Wally Charles Hoff and Robert Somerville, Toronto, Ontario, Canada, assignors to The McBee Company, Limited, Toronto, Ontario, Canada, a corporation
Filed Apr. 17, 1961, Ser. No. 103,515
9 Claims. (Cl. 101—407)

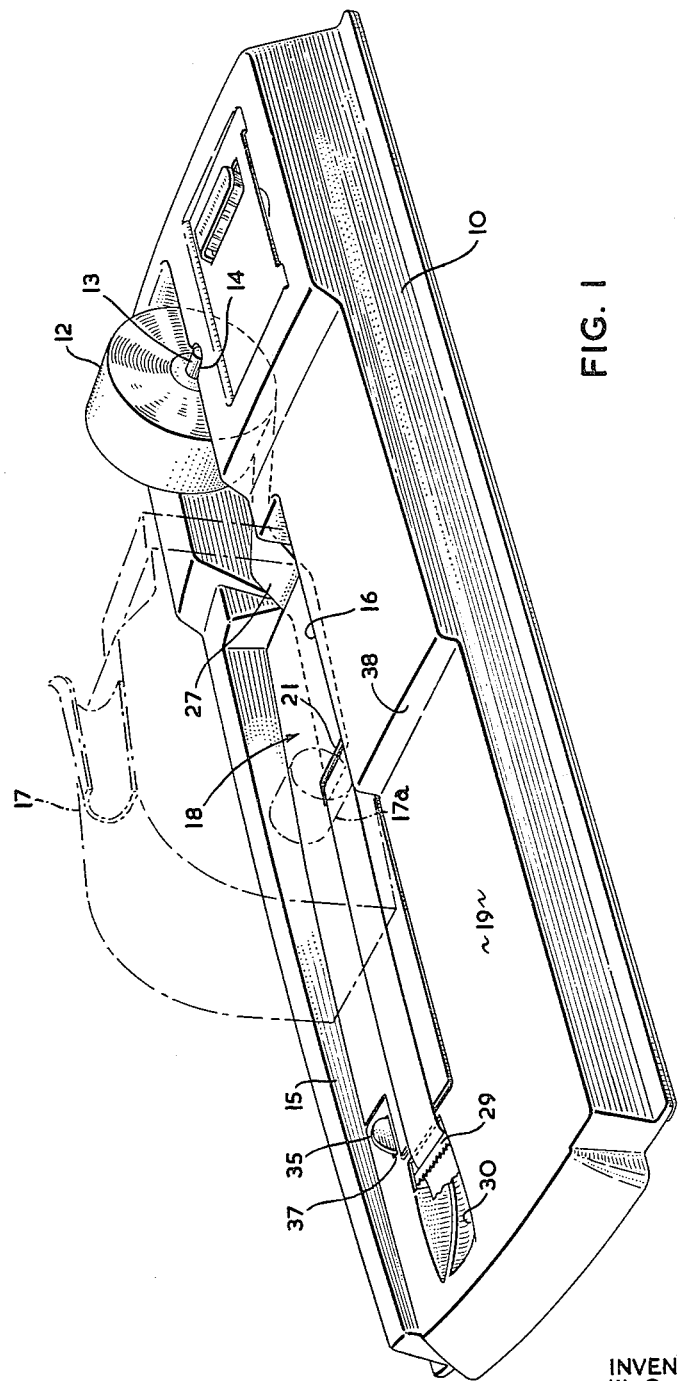

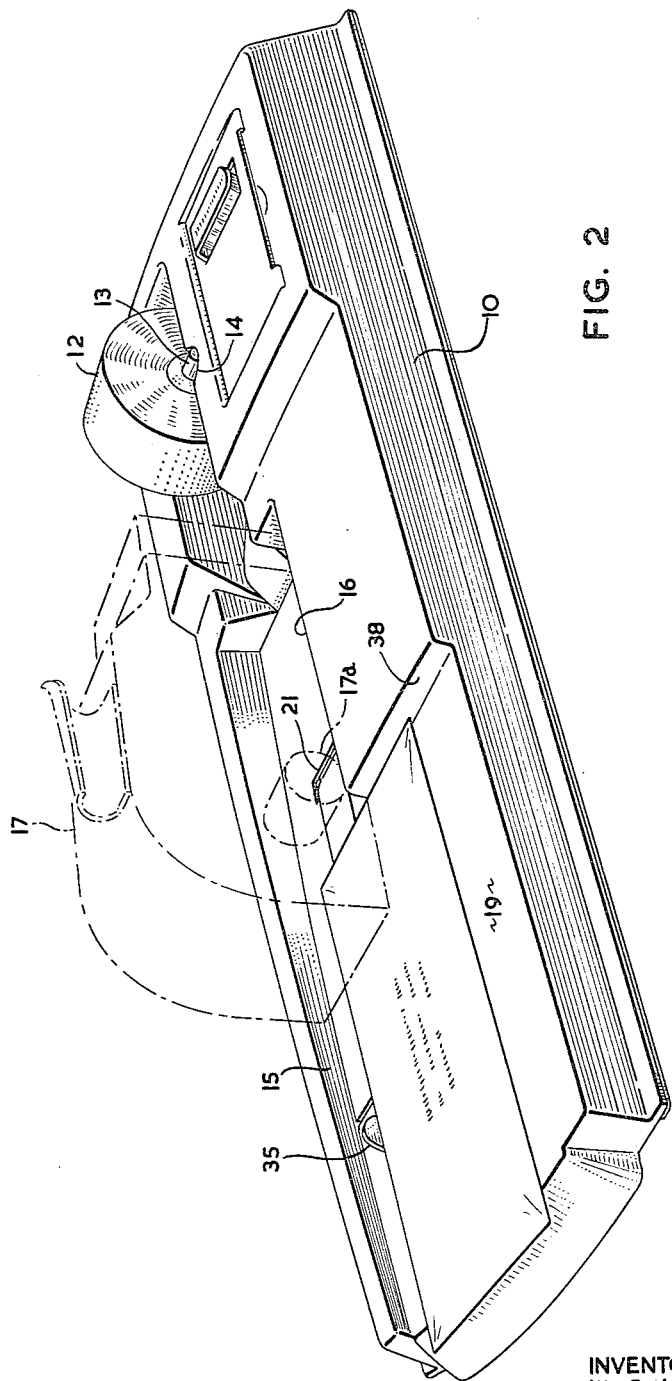

This invention relates to a base for supporting and guiding a postage meter of the type which is operative to print as the meter is traversed across a surface to be printed.

Small postage meters are at present on the market which are of such a size that they may be held in an operator's hand and rolled over an envelope or tape to print the latter. The meter mechanism is housed in a casing which is convenient to be held in the hand, and extending below the bottom surface of the casing is a segment of the periphery of a printing roller which is operative to print as the meter is rolled across the surface to be printed. In use, the operator holds the meter in one hand, locates an envelope to be printed on a supporting surface with the other hand, and then slides the meter over the envelope so as to print the latter with the desired postal legend. The meter can also be used for printing tape to be applied to parcels or packets. Such meters occasionally have encountered sales resistance since some skill is required to position the meter properly relative to the surface to be printed. Moreover, since the meter weighs approximately 5 lbs., an operator finds it tiring to print a considerable amount of mail.

It is an object of the present invention to provide a base for supporting and guiding a postage meter of the above type so that, no only is the manual effort required to operate the meter reduced, but also the envelope or tape to be printed is automatically located relative to the meter so that the printing is always executed in the correct position.

It is another object of the invention to provide a base for a postage meter so arranged that a store of postal tape provided on the base may have its free end portion located so as to be capable of being printed by the meter but so that said portion is overlaid by an envelope when the latter is positioned on the base for printing by the meter.

It is a further object of the invention to provide a base for a postage meter which is simple and inexpensive to manufacture.

The invention will now be described by way of example with reference to the accompanying drawings, in which like reference numerals indicate like parts throughout the several views, and in which:

FIGURE 1 is a perspective view of a base embodying the invention with a postage meter shown thereon in phantom lines and with a length of tape exposed for printing;

FIGURE 2 is a view similar to FIGURE 1 but showing the base supporting an envelope in position for printing;

FIGURE 3 is a longitudinal cross-sectional view through the base of FIGURES 1 and 2 with the meter omitted; and FIGURE 4 is a detail plan view of a wear-resistant plate.

Referring now to the drawings, the base comprises a unitary body 10 which is substantially rectangular in plan and is moulded from a suitable synthetic resinous material. The base is moulded from a sheet of the material about 1/16" thick so that its under surface is substantially a "reversal" of its upper surface.

At one end of the base there is moulded a well 11 adapted to receive a reel 12 of postal tape. The reel 12 is supported upon a spindle 13, the ends of which are received in notches 14 in the upper surface of the body. Extending along one of the longer edges of the body is a first guide 15 and a second guide 16 is arranged parallel to, and spaced from, the first guide 15.

A postage meter indicated generally at 17 is shown in FIGURES 1 and 2 at a rest station on the base between the guides 15 and 16 which are spaced apart a distance substantially equal to the width of the meter 17 to guide the latter as will hereinafter be described. The meter 17 comprises a casing shaped for gripping by the hand of an operator and has projecting from its under surface a segment of the periphery of a printing roller 17a.

Inset into the upper surface of the body is a wear-resistant plate 18 best shown in FIGURE 4. The plate 18 may be made of a vinyl plastic and is inset in the upper surface of the body 10 so that its upper surface lies substantially flush with the upper surface of the portion 19 of the body. The plate 18 is received in a depression 20 in the portion 19 of the body, and is provided with a transverse slot 21 approximately midway between its ends. The plate 18 also is provided with an insert 22 of rubber or other friction material which is of substantially the same width as the slot and is aligned therewith as clearly shown in FIGURE 4. The insert 22 extends from one end of the member 18 to a position adjacent to, but spaced from, the slot 21. One corner of the plate 18 is cut away as indicated at 23 for a purpose hereinafter to be described.

The depression 20 itself has a recess 24 as indicated in FIGURE 3 and, while the plate 18 lies closely against the base of the depression 20, the under surface of the plate 18 is spaced from the base of the recess 24 so as to leave a passage 25 between the plate and the base of the recess 24. The passage 25 terminates at one end in the slot 21 and at the other end is opened as indicated at 26 so that tape 27 led off from the reel 12 may pass over a hump 28, forming part of the well 11, and into the passage 25; the hump 28 assists in "decurling" the tape 27 as it is unrolled from the reel 12. The tape leaves the passage 25 through the slot 21 and is supported by the upper surface of the insert 22 as clearly shown in FIGURES 1 and 3. The free end of the tape is fed beneath a serrated cutter blade 29 positioned in a well 30 in the upper surface of the body. It is apparent that the free end of the tape, indicated at 31 in FIGURE 3, may be pulled to the left to position a fresh length of tape above the insert 22 and that the tape removed may be severed from the main body of the tape by means of the serrated blade 29.

The plate 18 provides adjacent rest and printing stations for the meter 17. In FIGURE 3, the portion of the plate 18 which provides the rest station is indicated generally at 32 and the portion of the plate 18 which provides the printing station is indicated generally at 33. The portions are separated by a discontinuity 34 so that the portion 32 slopes downwardly relative to the portion 33 for a purpose hereinafter to be described. It will be seen that the rubber insert 22 is located in that portion 34 of the plate 18 which provides the printing station. Thus, referring to FIGURE 1, if the meter 17 is moved to the left it will move from the rest station to the printing station under the guidance of the guides 15 and 16 and will print the tape which overlies the rubber insert 22, the latter providing a pad which cooperates with the printing roller 17a when it performs a printing operation, and also serving to prevent the tape being printed from being slid along by the meter as the latter moves.

The base also includes first and second stops for locating envelopes at the printing station to be printed by the meter. The first stop is indicated at 35 and comprises the bent-up tip of a strip 36 of resilient plastic material.

The strip 36 is secured to the under surface of the body at a position remote from the tip 35 and the latter projects, and may retract, through a slot 37 in the body and is, in effect, resiliently mounted. The stop 35 is received in the cut-out portion 23 of the plate 18 and serves to locate an envelope laterally of the direction of traversing movement of the meter 17 between its rest and printing stations. The second envelope stop is fixed and is indicated at 38. The stop 38 constitutes an extension of the second guide 16 extending normal thereto and serves to position an envelope at the printing station in the direction of traversing movement of the meter.

The base is used in the following manner. A reel of tape 12 is mounted in the well 11 with its spindle 13 received in the notches 14, and tape from the reel is threaded along the passage 25 from the end 26 and through the slot 21. The free end of the tape is then placed under the cutter blade 29 as shown in FIGURE 1 so that a length of tape overlies the insert 22 at the printing station. The meter is then placed on the base at its rest station as shown in FIGURE 1. If it is desired to print tape, the meter merely is moved to the left and the printing roller 17a prints the tape with a legend depending on the setting of the meter. As the meter, during its traversing movement between the rest and printing stations, comes into contact with the stop 35 it causes the latter to retract through the slot 37 out of the path of the meter. The free end of the tape is then pulled to bring the printed portion of the tape past the blade 29 thus positioning a fresh length of tape at the printing station and enabling the printed tape to be torn off for use.

If it is desired to print an envelope, the envelope is placed on the upper surface of the portion 19 as shown in FIGURE 2 so that the upper edge of the envelope is located by the stop 35 and its right hand end by the stop 38. The meter is then traversed to the left from the rest station to the printing station to print the envelope. Due to the difference in slope between the portions 32 and 33, the meter is able to pass easily over the right-hand end of the envelope so that a thick envelope, or the top envelope of a stack of thinner envelopes, may easily be printed without the left hand end of the meter engaging the end of the envelope to be printed and moving it away from the stops. It will be seen clearly from FIGURE 2 that, when an envelope is located at the printing station by means of the stops 35 and 38 the envelope overlies, at the printing station, tape which extends through the slot 21 from the end of the passage 25 adjacent to the printing station. Moreover, since the tape passes through the passage 25 beneath the rest station of the meter, the tape is not printed by the roller 17a of the meter when the latter is in, or is being returned to, the rest station.

It will also be seen that, duing its traversing movement, the meter 17 is guided by the guide 15 which extends along an edge of the base between the rest and printing stations. The second guide 16, in combination with the first guide 15, prevents the meter from turning about a vertical axis during its traversing movement.

The invention provides a simple and useful base for guiding and supporting a postage meter and envelopes and tape to be selectively printed thereby.

It will be understood that the form of the invention herewith shown and described is a preferred example and various modifications can be carried out without departing from the spirit of the invention or the scope of the appended claims.

What we claim as our invention is:

1. A base for supporting and guiding a postage meter of the type operative to print as the meter is traversed over a surface to be printed and for suppoting envelopes and tape to be selectively printed by the meter, the base comprising a body having an upper surface which provides adjacent rest and printing stations for the meter, a guide upstanding from said surface and extending between the stations to guide the meter during traversing movement of the latter between the stations, a first stop for locating an envelope at the printing station laterally of the direction of traversing movement of the meter, a resilient mounting for said first stop to enable the latter to retract through a slot in the upper surface of the body upon engagement of the stop with the meter during said traversing movement, a second fixed stop for locating an envelope at the printing station in the direction of traversing movement of the meter, storage means on the body for tape to be printed by the meter, and a passage for tape extending through the body between the storage means and the printing station, said stops being positioned so that an envelope located thereby overlies tape, at the printing station, extending from the end of the passage adjacent to the printing station.

2. A base according to claim 1, wherein the second stop and its resilient mounting comprise a strip of resilient material having a first portion which provides the stop and extends through said slot and a second portion which extends beneath the upper surface of the body and is secured thereto at a position remote from the first portion so that said first portion retracts through the slot upon bending of the second portion away from said upper surface.

3. A base for supporting and guiding a postage meter of the type operative to print as the meter is traversed over a surface to be printed and for supporting envelopes and tape to be selectively printed by the meter, the base comprising a body having an upper surface which provides adjacent rest and printing stations for the meter, first and second parallel, spaced-apart guides for the meter upstanding from said surface, the first guide extending between said stations along an edge of the body to guide the meter during traversing movement thereof between the stations and the second guide being spaced from the first guide by a distance substantially equal to the width of the meter and extending only adjacent to the rest station, first and second stops for locating envelopes at the printing station, the first stop being adjacent to the first guide and locating an envelope laterally of the direction of traversing movement of the meter, a resilient mounting for the first stop so that the latter may retract through a slot in the upper surface of the body as the stop is engaged by the meter during its traversing movement, the second stop extending from the second guide normally thereto and providing location for an envelope in the direction of traversing movement of the meter, storage means on the body for tape to be printed by the meter, and a passage for tape extending through the body between the storage means and the printing station, said stops being position so that an envelope located thereby overlies tape, at the printing station, extending from the end of the passage adjacent to the printing station.

4. A base for supporting and guiding a postage meter of the type having printing means operative as the meter is traversed over a surface to be printed and for supporting envelopes and tape to be selectively printed by the meter, the base comprising a body, a wear-resistant plate secured to the upper portion of the body, portions of the upper surface of said plate providing adjacent rest and printing stations for the meter, a guide upstanding from said body and extending between the stations to guide the meter during traversing movement of the latter between the stations, first and second stops for locating an envelope at the printing station, the first stop locating an envelope laterally of said traversing movement, a resilient mounting for the first stop to enable the latter to retract through a slot in said surface upon engagement of the stop by the meter during said traversing movement, the second of said stops being fixed and locating an envelope in the direction of said traversing movement, storage means on the body for a reel of tape to be printed by the meter, a passage for tape extending beneath that portion of said plate which provides the rest station and extending between the storage means and a slot in said plate adjacent to the printing station so that tape in the passage is led to the printing station without contacting the printing means of the meter when the latter is at the rest station, and a member of friction material inset in said plate and aligned with the slot therein so that tape extending from the slot to the printing station overlies said member, said stops being positioned so that an envelope located thereby overlies the tape supported by said member.

5. A base according to claim 4, including cutting means for the tape located adjacent to the printing station so that printed tape may be removed from said station and severed from the main body of the tape held by storage means.

6. A base for supporting and guiding a postage meter of the type having printing means operative as the meter is traversed over a surface to be printed and for supporting envelopes and tape to be selectively printed by the meter, the base comprising a body having an upper surface which provides adjacent rest and printing stations for the meter, a guide upstanding from said surface and extending between the stations to guide the meter during traversing movement of the latter between the stations, first and second stops for locating envelopes at the printing station, the first stop extending parallel to the guide and the second stop extending transversely relative to the guide at the edge of the printing station adjacent to the rest station, storage means on the body for tape to be printed by the meter, a passage for tape extending through the body parallel to the guide between the storage means and the printing station, the storage means being located so that the rest station is between the storage means and the printing station, and a plate forming part of the body and located so that its upper surface provides the rest station and its lower surface provides the upper boundary of the passage so that tape in said passage is led to the printing station whilst positively separated by said plate from the printing means of the meter when the latter is at the rest station and upon emerging from the passage is in position to be printed by the meter, said stops being positioned so that an envelope being located thereby overlies, at the printing station, tape extending from the end of the passage adjacent to the printing station.

7. A base for supporting and guiding a postage meter of the type operative to print as the meter is traversed over a surface to be printed and for supporting envelopes and tape to be selectively printed by the meter, the base comprising a body having an upper surface which provides adjacent rest and printing stations for the meter, a guide upstanding from said surface and extending between the stations to guide the meter during traversing movement of the latter between the stations, first and second stops for locating envelopes at the printing station, the first stop extending parallel to the guide and the second stop extending transversely relative to the guide at the edge of the printing station adjacent to the rest station, storage means on the body for tape to be printed by the meter, the storage means being located so that the rest station is between the storage means and the printing station, a passage for tape extending through the body parallel to the guide between the storage means and the printing station, a plate forming part of the body and located so that its upper surface provides the rest station and its lower surface provides the upper boundary of the passage so that tape in said passage is led to the printing station whilst positively separated by said plate from the printing means of the meter when the latter is at the rest station, and a member of friction material inset in the upper surface of the body at the printing station and aligned with the end of the passage adjacent to the printing station so that tape extending from said end overlies the member in position to be printed by the meter, said stops being positioned so that an envelope located thereby overlies the tape which is supported by the member of friction material at the printing station.

8. A base for supporting and guiding a postage meter of the type having printing means operative as the meter is traversed over a surface to be printed and for supporting envelopes and tape to be selectively printed by the meter, the base comprising a body, a wear-resistant plate secured to the upper portion of the body, the upper surface of said plate providing adjacent rest and printing stations for the meter, a guide upstanding from said body and extending between the stations to guide the meter during traversing movement of the latter between the stations, first and second stops for locating envelopes at the printing station, the first stop extending parallel to the guide and the second stop extending transversely relative to the guide at the edge of the printing station adjacent to the rest station, storage means on the body for tape to be printed by the meter, the storage means being located so that the rest station is between the storage means and the printing station, a passage for tape extending parallel to the guide beneath the part of the plate which provides the rest station and between the storage means and a slot in the plate adjacent to the printing station so that tape is led from the storage means to the printing station through said passage whilst positively separated by the plate from the printing means of the meter when the latter is at the rest station, and a member of friction material inset in the upper surface of the plate at the printing station and aligned with said slot so that tape extending from the slot overlies said member, said stops being positioned so that an envelope located thereby overlies the tape which is supported by the member of friction material.

9. A base for supporting and guiding a postage meter of the type operative to print as the meter is traversed over a surface to be printed and for supporting envelopes and tape to be selectively printed by the meter, the base comprising a body having an upper surface portion which provides adjacent rest and printing stations for the meter, the portion of said surface which provides the rest station being inclined relative to the portion of the surface which provides the printing station so that parts of the rest station remote from the printing station are lower than parts of the rest station adjacent to the printing station, a guide upstanding from said surface and extending between the stations to guide the meter during traversing movement of the latter between the stations, first and second stops for locating envelopes at the printing station, the first stop extending parallel to the guide and the second stop extending transversely relative to the guide at the edge of the printing station adjacent to the rest station, storage means on the body for tape to be printed by the meter, the storage means being located so that the rest station is between the storage means and the printing station, a passage for tape extending through the body parallel to the guide between the storage means and the printing station, and a plate forming part of the body and located so that its upper surface provides the rest station and its lower surface provides the upper boundary of the passage so that tape in said passage is led to the printing station whilst positively separated by the plate from the printing means of the meter when the latter is at the rest station, said stops being positioned so that an envelope located thereby overlies, at the printing station, tape extending from the end of the passage adjacent to the printing station.

References Cited in the file of this patent

UNITED STATES PATENTS

| | | |
|---|---|---|
| 936,954 | Sloane et al. | Oct. 12, 1909 |
| 1,532,837 | Seiders | Apr. 7, 1925 |
| 1,634,855 | Sivertzen | July 5, 1927 |
| 2,863,390 | Kubovy | Dec. 9, 1958 |